(12) United States Patent  
Romer et al.

(10) Patent No.: US 7,214,638 B2
(45) Date of Patent: May 8, 2007

(54) OLEFIN POLYMERIZATION CATALYST COMPOSITION COMPRISING GROUP 13 AMIDE DERIVATIVES

(75) Inventors: Duane R. Romer, Midland, MI (US); James C. Stevens, Richmond, TX (US); Robert K. Rosen, Lafayette, CA (US); Francis J. Timmers, Midland, MI (US); Hendrik E. Tuinstra, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 114 days.

(21) Appl. No.: 10/533,706

(22) PCT Filed: Nov. 17, 2003

(86) PCT No.: PCT/US03/36483

§ 371 (c)(1),
(2), (4) Date: May 3, 2005

(87) PCT Pub. No.: WO2004/055067

PCT Pub. Date: Jul. 1, 2004

(65) Prior Publication Data

US 2007/0055031 A1    Mar. 8, 2007

Related U.S. Application Data

(60) Provisional application No. 60/433,180, filed on Dec. 13, 2002.

(51) Int. Cl.
*B01J 31/38* (2006.01)
*C08F 4/642* (2006.01)

(52) U.S. Cl. .................. 502/124; 502/123; 502/129; 502/132; 502/114; 526/153; 526/134; 526/141; 526/147; 526/160; 526/170; 526/346

(58) Field of Classification Search .............. 502/114, 502/124, 132, 123; 526/153, 134
See application file for complete search history.

(56) References Cited

U.S. PATENT DOCUMENTS

| 3,255,169 | A | * | 6/1966 | Kearby ................. 526/158 |
|---|---|---|---|---|
| 4,224,182 | A | * | 9/1980 | Langer, Jr. et al. ....... 502/121 |
| 5,055,438 | A | | 10/1991 | Canich |
| 5,057,475 | A | | 10/1991 | Canich et al. |
| 5,064,802 | A | | 11/1991 | Stevens et al. |
| 5,096,867 | A | | 3/1992 | Canich |
| 5,132,380 | A | | 7/1992 | Stevens et al. |
| 5,206,199 | A | | 4/1993 | Kioka et al. |
| 5,215,951 | A | * | 6/1993 | Sasaki et al. ............ 502/126 |
| 5,374,696 | A | | 12/1994 | Rosen et al. |
| 5,453,410 | A | | 9/1995 | Kolthammer et al. |
| 5,470,993 | A | | 11/1995 | Devore et al. |
| 5,962,599 | A | | 10/1999 | Abe et al. |
| 6,017,842 | A | * | 1/2000 | Rosen et al. ............. 502/124 |
| 6,074,977 | A | | 6/2000 | Rosen et al. |
| 6,268,063 | B1 | | 7/2001 | Kaminaka et al. |
| 6,353,063 | B1 | | 3/2002 | Shimizu et al. |

FOREIGN PATENT DOCUMENTS

| EP | 416815 | | 8/1990 |
|---|---|---|---|
| EP | 514828 | | 5/1992 |
| EP | 520732 | | 12/1995 |
| GB | 1135681 | * | 12/1968 |
| WO | WO 96/15161 A | * | 5/1996 |

* cited by examiner

*Primary Examiner*—David W. Wu
*Assistant Examiner*—Rip A. Lee

(57) ABSTRACT

Catalyst compositions that are highly tolerant of catalyst poisons for use in addition polymerizations comprising a catalytic derivative of a Group 4 metal complex, a cocatalyst, and a Group 13 metal amide compound.

8 Claims, 1 Drawing Sheet

OLEFIN POLYMERIZATION CATALYST COMPOSITION COMPRISING GROUP 13 AMIDE DERIVATIVES

CROSS REFERENCE STATEMENT

This application claims the benefit of U.S. Provisional Application No. 60/433,180, filed Dec. 13, 2002.

BACKGROUND OF THE INVENTION

This invention relates to compositions of matter which are useful as addition polymerization catalysts, to a method for preparing these catalyst compositions and to a method of using these catalyst compositions. More particularly, this invention relates to improved olefin polymerization catalyst compositions comprising a Group 4 metal complex, an activator therefor, and a Group 13 aromatic amide tertiary component. The invention also relates to an improved method for polymerizing addition polymerizable monomers using these catalyst compositions.

Constrained geometry metal complexes, their preparation, methods of activation, active catalysts formed therefrom including cationic catalysts and methods of use are disclosed in EP-A-416,815; EP-A-514,828; EP-A-520,732; U.S. Pat. No. 5,064,802; U.S. Pat. No. 5,374,696; U.S. Pat. No. 5,470,993; U.S. Pat. No. 5,055,438, U.S. Pat. No. 5,057,475, U.S. Pat. No. 5,096,867, U.S. Pat. No. 5,064,802, U.S. Pat. No. 5,132,380, and U.S. Pat. No. 5,453,410.

Although previously known active catalysts, especially the cationic catalysts disclosed in the foregoing applications and publications, have excellent activity they are extremely sensitive to catalyst poisons, such as polar impurities, that may be contained in a polymerization mixture. Because of this fact, catalyst efficiencies and lifetimes have been limited and molecular weights of the resulting polymers have been reduced. In addition, it has now been observed that certain tertiary substances that are added to the reaction mixture to improve catalyst efficiency disadvantageously result in the formation of increased levels of a polymer fraction having high crystallinity. Such high crystallinity fractions (HCF) may result in fouling of the reactor and are desirably eliminated or at least reduced in order to increase production efficiency and product uniformity.

It is previously known in the art to utilize adjuvants such as trialkylboron compounds, trialkylaluminum compounds, dialkylaluminum alkoxides and dialkylaluminum N,N-di (hydrocarbyl)amides to remove catalyst poisons from various olefin polymerization catalysts. Examples of such compositions are contained in U.S. Pat. No. 6,074,977, U.S. Pat. No. 6,017,842, U.S. Pat. No. 5,206,199, U.S. Pat. No. 5,962,599, U.S. Pat. No. 6,268,063 and U.S. Pat. No. 6,353,063. Disadvantageously however, such adjuvants have proven to be less effective in combating the inhibition of catalytically activated constrained geometry catalysts, and have not demonstrated reduced HCF formation or reduced reactor fouling.

The present investigations have led to certain improved catalyst compositions that are highly active as addition polymerization catalysts, desirably having improved resistance to catalyst poisons with reduced production of high crystalline fraction polymers.

SUMMARY OF THE INVENTION

According to the present invention there is now provided a catalyst composition comprising:

a) a transition metal complex capable of being activated for polymerization of addition polymerizable monomers;

b) an activator compound able to render the transition metal complex catalytically active for polymerization of addition polymerizable monomers; and c) a Group 13 metal compound corresponding to the formula:

$$R^a M(N(R^b)_2)_2 \quad \text{or} \tag{1}$$

$$\tag{2}$$

wherein,

M, independently each occurrence is a group 13 metal, preferably aluminum;

$R^a$ is a hydrocarbyl, halocarbyl, halohydrocarbyl, tri(hydrocarbyl)silyl, or tri(hydrocarbyl)silyl-substituted hydrocarbyl radical of from 1 to 20 carbon, silicon or mixtures of carbon and silicon atoms, preferably $C_{1-6}$ alkyl;

$R^b$ independently each occurrence is a $C_{1-30}$ hydrocarbyl group, preferably alkyl or aryl, most preferably $C_{6-20}$ aryl;

$R^c$ independently each occurrence is selected from hydrogen, $R^a$, $-NR^b_2$, or a halo- or di($C_{1-10}$ hydrocarbyl)amino-substituted hydrocarbyl group, and optionally one or more of $R^c$ groups may be shared by both metal centers, M, in the form of a µ-bridged structure, preferably $R^c$ is a hydrocarbyl group or $-NR^b_2$, wherein $R^b$ is $C_{6-20}$ aryl; and $R^d$, is a divalent, anionic ligand group of up to 30 atoms, not counting hydrogen, preferably a hydrocarbadiyl group, or a halo- or di($C_{1-10}$ hydrocarbyl)amino-substituted hydrocarbadiyl group, most preferably $R^d$ is $C_{6-20}$ arylene.

Further according to the present invention there is provided a process for polymerization of addition polymerizable monomers or mixtures thereof comprising contacting said monomer or mixture of monomers with a catalyst system comprising the above catalyst composition under addition polymerization conditions. Preferred addition polymerizable monomers include $C_{2-20,000}$ α-olefins. Polymers prepared by the foregoing invented process are usefully employed for molding, film, sheet, extrusion foaming and other applications.

As a final embodiment of the invention, there is provided the foregoing group 13 compounds (2), which are novel compounds that are usefully employed as tertiary polymerization components in the foregoing process.

Use of the present catalyst compositions and processes result in the highly efficient production of high molecular weight olefin polymers over a wide range of polymerization conditions, with reduced incidence of high crystalline fraction polymer formation. They are especially useful for the formation of copolymers of ethylene and styrene (ES polymers) and ethylene/styrene/diene (ESDM polymers) wherein the diene is ethylidenenorbornene, 1,4-hexadiene or similar nonconjugated diene.

The catalyst compositions of this invention may also be supported on a support material and used in olefin polymerization processes in a slurry or in the gas phase. The catalyst may be prepolymerized with one or more olefin monomers in situ in a polymerization reactor or in a separate process with intermediate recovery of the prepolymerized catalyst prior to the primary polymerization process.

DETAILED DESCRIPTION OF THE INVENTION

Figure 1:
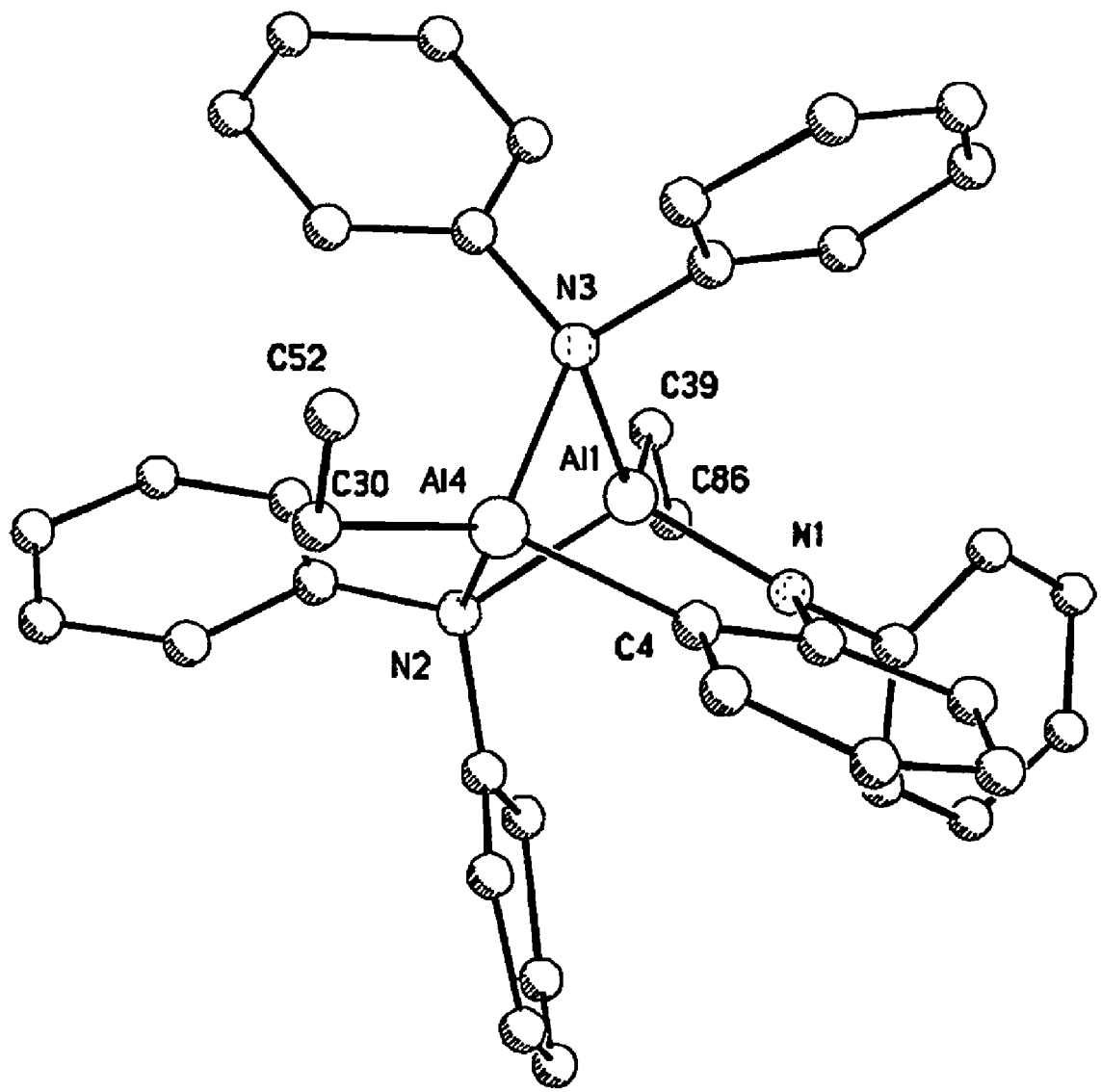
FIG. 1 is a computer rendering (ORTEP) of the metal complex of Example 1 determined by single crystal X-ray diffraction analysis.

All reference to the Periodic Table of the Elements herein shall refer to the Periodic Table of the Elements, published and copyrighted by CRC Press, Inc., 2001. Also, any reference to a Group or Groups shall be to the Group or Groups as reflected in this Periodic Table of the Elements using the IUPAC system for numbering groups. For purposes of United States patent practice, the contents of any patent, patent application or publication referenced herein is hereby incorporated by reference in its entirety, especially with respect to the disclosure of analytical or synthetic techniques and general knowledge in the art.

The term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term "polymer", as used herein, includes both homopolymers, that is, polymers prepared from a single reactive compound, and copolymers, that is, polymers prepared by reaction of at least two polymer forming reactive, monomeric compounds. The term "crystalline" refers to a polymer that exhibits an X-ray diffraction pattern at 25° C. and possesses a first order transition or crystalline melting point (Tm). The term may be used interchangeably with the term "semicrystalline".

The foregoing components a), b) and c) of the catalyst composition are present in relative amounts to produce polymeric materials in a highly efficient polymerization process. Highly desirably, the molar ratio of a):b) is from 1:0.1 to 1:1000, more preferably from 1:0.5 to 1:100. The molar ratio of a):c) is desirably from 1:0.1 to 1:10, more preferably from 1:0.5 to 1:1. The respective components may be combined in any order or incorporated into other components of the reaction mixture such as the solvent or monomer(s) prior to contacting with the remaining components of the catalyst composition. Highly desirably, component c) is added to the solvent or monomer(s) employed in the polymerization prior to contacting with the remaining catalyst components a) and c).

The catalyst, component a), is desirably a metal complex corresponding to the formula:

$$L_t MX_p X'_q,\qquad\qquad(II)$$

wherein: M is a metal of Group 4 of the Periodic Table of the Elements having an oxidation state of +2, +3 or +4, bound in an 5 bonding mode to one or more L groups;

L independently each occurrence is a cyclopentadienyl-, indenyl-, tetrahydroindenyl-, fluorenyl-, tetrahydrofluorenyl-, or octahydrofluorenyl-group optionally substituted with from 1 to 8 substituents independently selected from the group consisting of hydrocarbyl, halo, halohydrocarbyl, aminohydrocarbyl hydrocarbyloxy, dihydrocarbylamino, dihydrocarbylphosphino, silyl aminosilyl hydrocarbyloxysilyl and halosilyl groups containing up to 20 non-hydrogen atoms, or further optionally two such L groups may be joined together by a divalent substituent selected from hydrocarbadiyl, halohydrocarbadiyl hydrocarbyleneoxy, hydrocarbyleneamino, siladiyl, halosiladiyl, and divalent aminosilane, groups containing up to 20 non-hydrogen atoms;

X independently each occurrence is a monovalent or polyvalent anionic ligand group having one or more shared of donative bonds to M, and optionally one or more shared or donative bonds to one or more L groups, said X containing up to 60 nonhydrogen atoms;

X' independently each occurrence is a neutral Lewis base ligating compound, having up to 20 atoms;

t, p, and q are 0, 1 or 2.

The compositions of the present invention are believed to exist in the form of a mixture of one or more cationic, zwitterionic or other catalytically active species derived from the foregoing metal complex a) in combination with the activator compound, b), or alternatively, a mixture of the metal complex or a cationic, zwitterionic or other catalytically active derivative thereof with a derivative formed by interaction of compound c) with the cocatalyst or with the activated catalyst. Fully cationic or partially charge separated metal complexes, that is, zwitterionic metal complexes, have been previously disclosed in U.S. Pat. Nos. 5,470,993 and 5,486,632. Derivatives of the Group 13 compound and cocatalyst may arise, for example, by ligand exchange. In particular, where the cocatalyst is a strong Lewis acid, such as tris(fluorophenyl)borane, some quantity of fluorophenyl substituents may exchange with the ligand groups of the Group 13 compound to form fluorophenyl substituted derivatives thereof.

The cationic complexes are believed to correspond to the formula:

$$L_t M^+ X_{p-1} A^-\qquad\qquad(III)$$

wherein:

M is a Group 4 metal in the +4 or +3 formal oxidation state;

L, X, t and p are as previously defined; and $A^-$ is a noncoordinating, compatible anion derived from the activating cocatalyst.

The zwitterionic complexes in particular result from activation of a Group 4 metal diene complex that is in the form of a metallocyclopentene, wherein the metal is in the +4 formal oxidation state, (that is X is 2-butene-1,4-diyl, or a hydrocarbyl substituted derivative thereof, having both valencies bonded to M) by the use of a Lewis acid activating cocatalyst, especially tris(perfluoroaryl)boranes. These zwitterionic complexes are believed to correspond to the formula:

$$L_t M^+ X_{p-1} X^{**} \text{-} A^-\qquad\qquad(IV)$$

wherein:

M is a Group 4 metal in the +4 formal oxidation state;

L, X, t and p are as previously defined;

X** is the divalent remnant of the conjugated diene, X', formed by ring opening at one of the carbon to metal bonds of a metallocyclopentene; and A⁻ is a noncoordinating, compatible anion derived from the activating cocatalyst.

As used herein, the recitation "noncoordinating" means an anion which either does not coordinate to component a) or which is only weakly coordinated therewith remaining sufficiently labile to be displaced by a neutral Lewis base, including an α-olefin A non-coordinating anion specifically refers to an anion which when functioning as a charge balancing anion in the catalyst system of this invention, does not transfer a fragment thereof to said cation thereby forming a neutral four coordinate metal complex and a neutral byproduct. "Compatible anions" are anions which are not degraded to neutrality when the initially formed complex decomposes and are noninterfering with desired subsequent polymerizations.

Preferred X' groups are phosphines, especially trimethylphosphine, triethylphosphine, triphenylphosphine and bis (1,2-diethylphosphino)ethane; P(OR)₃, wherein R is as previously defined; ethers, especially tetrahydrofuran; amines, especially pyridine, bipyridine, tetramethylethylenediamine (TMEDA), and triethylamine; olefins; and conjugated dienes having from 4 to 40 carbon atoms. Complexes including conjugated diene X' groups include those wherein the metal is in the +2 formal oxidation state.

Examples of coordination complexes a) used according to the present invention include the foregoing species:

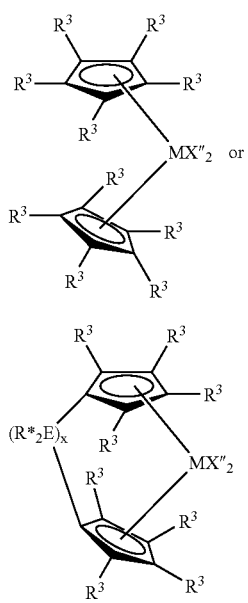

wherein:

M is titanium, zirconium or hafnium, preferably zirconium or hafnium, in the +2 or +4 formal oxidation state;

R³ in each occurrence independently is selected from the group consisting of hydrogen, hydrocarbyl silyl, germyl cyano, halo and combinations thereof, said R³ having up to 20 non-hydrogen atoms, or adjacent R³ groups together form a divalent derivative (that is, a hydrocarbadiyl siladiyl or germadiyl group) thereby forming a fused ring system, X" independently each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms forming a π-complex with M, whereupon M is in the +2 formal oxidation state, R* independently each occurrence is $C_{1-4}$ alkyl or phenyl, E independently each occurrence is carbon or silicon, and x is an integer from 1 to 8.

Additional examples of metal complexes a) include those corresponding to the formula:

$$LMX_pX'_q \qquad (VII)$$

wherein L, M, X, X', p and q are as previously defined. A preferred metal complex belongs to the foregoing class (VII) and corresponds to the formula:

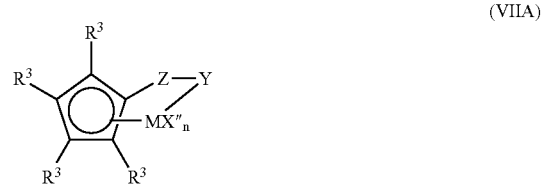

wherein:

M is titanium, zirconium or hafnium in the +2, +3 or +4 formal oxidation state;

R³ in each occurrence independently is selected from the group consisting of hydrogen, hydrocarbyl, silyl, germyl, cyano, halo and combinations thereof, said R³ having up to 20 non-hydrogen atoms, or adjacent R³ groups together form a divalent derivative (that is, a hydrocarbadiyl, siladiyl or germadiyl group) thereby forming a fused ring system, each X" is a halo, hydrocarbyl, hydrocarbyloxy, hydrocarbylamino, or silyl group, said group having up to 20 non-hydrogen atoms, or two X" groups together form a neutral $C_{5-30}$ conjugated diene or a divalent derivative thereof;

Y is —O—, —S—, —NR*—, —PR*—;

Z is $SiR*_2$, $CR*_2$, $SiR*_2SiR*_2$, $CR*_2CR*_2$, $CR*=CR*$, $CR*_2SiR_2$, or $GeR*_2$, where R* is as previously defined, and n is an integer from 1 to 3.

Most preferred coordination complexes a) used according to the present invention are complexes corresponding to the formula:

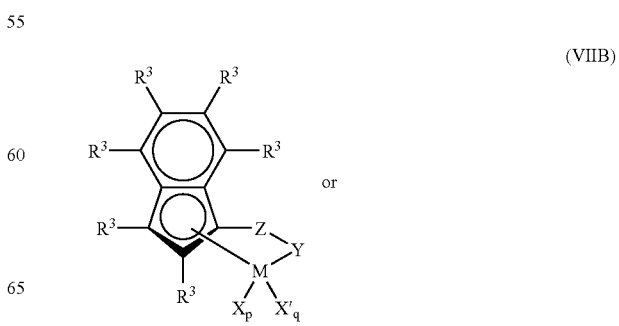

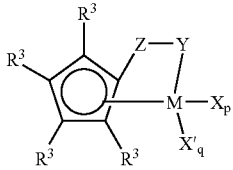

(VIIC)

wherein:

R³ independently each occurrence is a group selected from hydrogen, hydrocarbyl, halohydrocarbyl, silyl, germyl and mixtures thereof, said group containing up to 20 non-hydrogen atoms;

M is titanium, zirconium or hafnium;

Z, Y, X and X' are as previously defined;

p is 0, 1 or 2; and q is zero or one;

with the proviso that:

when p is 2, q is zero, M is in the +4 formal oxidation state, and X is an anionic ligand selected from the group consisting of halide, hydrocarbyl, hydrocarbyloxy, di(hydrocarbyl)amido, di(hydrocarbyl)phosphido, hydrocarbylsulfido, and silyl groups, as well as halo-, di(hydrocarbyl)amino-, hydrocarbyloxy- and di(hydrocarbyl)-phosphino-substituted derivatives thereof, said X group having up to 20 nonhydrogen atoms, when p is 1, q is zero, M is in the +3 formal oxidation state, and X is a stabilizing anionic ligand group selected from the group consisting of allyl, 2-(N,N-dimethylaminomethyl)phenyl, and 2-(N,N-dimethyl)-aminobenzyl, or M is in the +4 formal oxidation state, and X is a divalent derivative of a conjugated diene, M and X together forming a metallocyclopentene group, and when p is 0, q is 1, M is in the +2 formal oxidation state, and X' is a neutral, conjugated or nonconjugated diene, optionally substituted with one or more hydrocarbyl groups, said X' having up to 40 carbon atoms and forming a π-complex with M.

More preferred coordination complexes a) used according to the present invention are complexes corresponding to the formula:

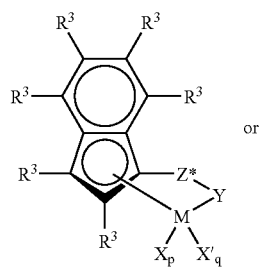

(VIIB')

or

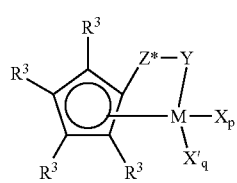

(VIIC')

wherein:

R³ independently each occurrence is hydrogen or $C_{1-6}$ alkyl;

M is titanium;

Y is —O—, —S—, —NR*—, —PR*—;

Z* is $SiR*_2$, $CR*_2$, $SiR*_2SiR*_2$, $CR*_2CR*_2$, CR*=CR*, $CR*_2SiR*_2$, or $GeR*_2$;

R* each occurrence is independently hydrogen, or a member selected from hydrocarbyl, hydrocarbyloxy, silyl, halogenated alkyl, halogenated aryl, and combinations thereof, said R* having up to 20 non-hydrogen atoms, and optionally, two R* groups from Z (when R* is not hydrogen), or an R* group from Z and an R* group from Y form a ring system;

p is 0, 1 or 2;

q is zero or one;

with the proviso that:

when p is 2, q is zero, M is in the +4 formal oxidation state, and X is independently each occurrence methyl or benzyl, when p is 1, q is zero, M is in the +3 formal oxidation state, and X is 2-(N,N-dimethyl)aminobenzyl; or M is in the +4 formal oxidation state and X is 2-butene-1,4-diyl, and when p is 0, q is 1, M is in the +2 formal oxidation state, and X'is 1,4-diphenyl-1,3-butadiene or 1,3-pentadiene. The latter diene is illustrative of unsymetrical diene groups that result in production of metal complexes that are actually mixtures of the respective geometrical isomers.

Additional examples of suitable metal complexes for use in the present invention include Group 4 metal derivatives, especially hafnium derivatives of hydrocarbylamine substituted heteroaryl compounds of the formula R'HN-T—R² (VI), said complexes corresponding to the formula:

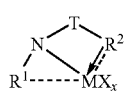

(VIIA)

wherein

R¹ is selected from alkyl cycloalkyl, heteroalkyl, cycloheteroalkyl, aryl, and inertly substituted derivatives thereof containing from 1 to 30 atoms not counting hydrogen;

T is a divalent bridging group of from 1 to 20 atoms other than hydrogen, preferably a mono- or di-$C_{1-20}$ hydrocarbyl substituted methylene or silane group, and R² is a $C_{6-20}$ heteroaryl group containing Lewis base functionality, especially a pyridin-2-yl- or substituted pyridin-2-yl group, and in the metal complex, M is the Group 4 metal, preferably hafnium, X is an anionic, neutral or dianionic ligand group, x is a number from 0 to 5 indicating the number of such X groups, and bonds, optional bonds and electron donative interactions are represented by lines, dotted lines and arrows respectively.

Preferred complexes are those wherein ligand formation results from hydrogen elimination from the amine group and optionally from the loss of one or more additional groups, especially from R². In addition, electron donation from the Lewis basic, heteroaryl functionality, preferably an electron pair, provides additional stability to the metal center. Preferred examples of the foregoing polyfunctional Lewis base compounds and the resulting metal complexes correspond to the formulas:

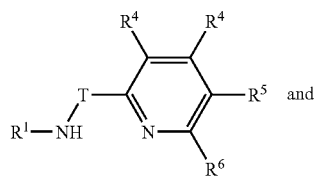
(VII¹)

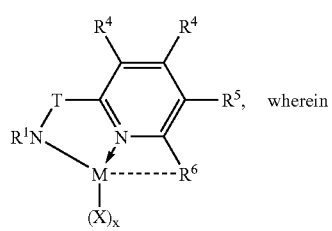
(VIIA¹)

M, X, x, R¹ and T are as previously defined,

R⁴, R⁵ and R⁶ independently each occurrence are hydrogen, halo, or an alkyl, cycloalkyl, heteroalkyl, heterocycloalkyl, aryl, or silyl group of up to 20 atoms not counting hydrogen, or adjacent R⁴, R⁵ or R⁶ groups may be joined together thereby forming fused ring derivatives, and bonds, optional bonds and electron pair donative interactions are represented by lines, dotted lines and arrows respectively.

More preferred examples of the foregoing difunctional Lewis base compounds and metal complexes correspond to the formula:

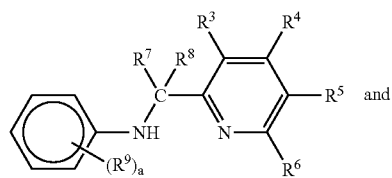
(VII²)

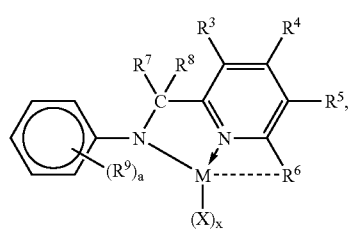
(VIIA²)

wherein

M, X, x, R¹ and T are as previously defined,

R³, R⁴, R⁵ and R⁶ are as previously defined, preferably R³, R⁴, and R⁵ are hydrogen, or $C_{1-4}$ alkyl, and R⁶ is $C_{6-20}$ aryl, most preferably naphthalenyl;

R⁹ independently each occurrence is $C_{1-4}$ alkyl, and a is 1–5, most preferably R⁹ in two ortho-positions is isopropyl or t-butyl;

R⁷ and R⁸ independently each occurrence are hydrogen or a $C_{1-20}$ alkyl or aryl group, most preferably one of R⁷ and R⁸ is hydrogen and the other is a $C_{6-20}$ aryl group, especially a fused polycyclic aryl group, most preferably an anthracenyl group, and bonds, optional bonds and electron pair donative interactions are represented by lines, dotted lines and arrows respectively.

Highly preferred polyfunctional Lewis base compounds and metal complexes for use herein correspond to the formula:

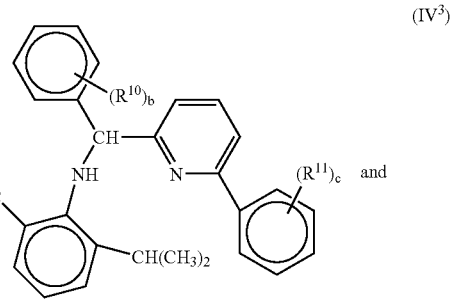
(IV³)

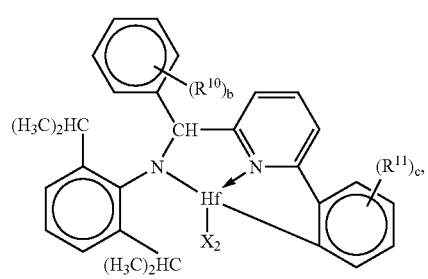
(IVA³)

wherein X each occurrence is halide, N,N-dimethylamido, or $C_{1-4}$ alkyl, and preferably each occurrence X is methyl;

R¹⁰ independently each occurrence is $C_{1-20}$ allyl or aryl, or two adjacent R¹⁰ groups are joined together thereby forming a ring, and b is 1–5; and R¹¹ independently each occurrence is $C_{1-20}$ alkyl or aryl, or two adjacent R¹¹ groups are joined together thereby forming a ring, and c is 1–5.

Most highly preferred examples of metal complexes for use according to the present invention are complexes of the following formulas:

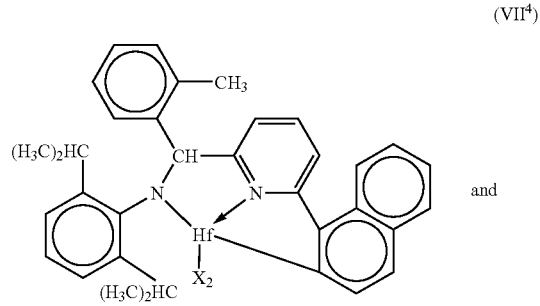
(VII⁴)

and

-continued (VIIA⁴)

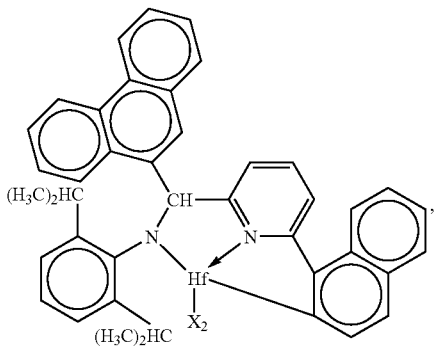

wherein X each occurrence is halide, N,N-dimethylamido, or C$_{1-4}$ alkyl, and preferably each occurrence X is methyl.

Specific examples of metal complexes (catalysts) usefully employed as component a) according to the present invention include:
bis(cyclopentadienyl)zirconiumdimethyl,
bis(cyclopentadienyl)zirconium dibenzyl,
bis(cyclopentadienyl)zirconium methyl benzyl,
bis(cyclopentadienyl)zirconium methyl phenyl,
bis(cyclopentadienyl)zirconiumdiphenyl,
bis(cyclopentadienyl)titanium-allyl,
bis(cyclopentadienyl)zirconiummethylmethoxide,
bis(cyclopentadienyl)zirconiummethylchloride,
bis(pentamethylcyclopentadienyl)zirconiumdimethyl,
bis(pentamethylcyclopentadienyl)titaniumdimethyl,
bis(indenyl)zirconiumdimethyl,
indenylfluorenylzirconiumdimethyl,
bis(indenyl)zirconiummethyl(2-dimethylamino)benzyl),
bis(indenyl)zirconiummethyltrimethylsilyl,
bis(tetrahydroindenyl)zirconiummethyltrimethylsilyl,
bis(pentamethylcyclopentadienyl)zirconiummethylbenzyl,
bis(pentamethylcyclopentadienyl)zirconiumdibenzyl,
bis(pentamethylcyclopentadienyl)zirconiummethylmethoxide,
bis(pentamethylcyclopentadienyl)zirconiummethylchloride,
bis(methylethylcyclopentadienyl)zirconiumdimethyl,
bis(butylcyclopentadienyl)zirconiumdibenzyl,
bis(t-butylcyclopentadienyl)zirconiumdimethyl,
bis(ethyltetramethylcyclopentadienyl)zirconiumdimethyl,
bis(methylpropylcyclopentadienyl)zirconiumdibenzyl,
bis(trimethylsilylcyclopentadienyl)zirconiumdibenzyl,
dimethylsilyl-bis(cyclopentadienyl)zirconiumdimethyl,
dimethylsilyl-bis(tetramethylcyclopentadienyl)titanium (III) allyl
dimethylsilyl-bis(t-butylcyclopentadienyl)zirconiumdibenzyl,
dimethylsilyl-bis(n-butylcyclopentadienyl)zirconium bis(trimethylsilyl),
(methylene-bis(tetramethylcyclopentadienyl)titanium(III) 2-(dimethylamino)benzyl,
(methylene-bis(n-butylcyclopentadienyl)titanium(III) 2-(dimethylamino)benzyl,
dimethylsilyl-bis(indenyl)zirconiumbenzylchloride,
dimethylsilyl-bis(2-methylindenyl)zirconiumdimethyl,
dimethylsilyl-bis(2-methylphenylindenyl)zirconiumdimethyl,
dimethylsilyl-bis(2-methylindenyl)zirconium-1,4-diphenyl-1,3-butadiene,
dimethylsilyl-bis(2-methyl-4-phenylindenyl)zirconium (II) 1,4-diphenyl-1,3-butadiene,
dimethylsilyl-bis(tetrahydroindenyl)zirconium(II) 1,4-diphenyl-1,3-butadiene,
di(isopropylamino)borandiylbis(2-methylphenylindenyl) zirconium dimethyl,
dimethylsilyl-bis(tetrahydrofluorenyl)zirconium bis(trimethylsilyl),
(isopropylidene)(cyclopentadienyl)(fluorenyl)zirconiumdibenzyl,
dimethylsilyl(tetramethylcyclopentadienyl)(fluorenyl)zirconium dimethyl,
cyclopentadienyltitaniumtrimethyl,
indenyltitaniumtrimethyl,
octahydrofluorenyltitaniumtrimethyl,
tetrahydroindenyltitaniumtrimethyl,
tetrahydrofluorenyltitaniumtrimethyl,
(tert-butylamido)(tetramethyl-$\eta^5$-cyclopentadienyl)dimethylsilanetitanium dibenzyl
(tert-butylamido)(tetramethyl-$\eta^5$-cyclopentadienyl)dimethysilanetitanium dimethyl
(tert-butylamido)(tetramethyl-$\eta^5$-cyclopentadienyl-1,2-ethanediyltitanium dimethyl,
(tert-butylamido)(tetramethyl-$\eta^5$-indenyl)dimethylsilanetitanium dimethyl
(tert-butylamido)(tetramethyl-$\eta^5$-cyclopentadienyl)dimethylsilane titanium (III) 2-(dimethylamino)benzyl;
(tert-butylamido)(tetramethyl-$\eta^5$-cyclopentadienyl)dimethylsilanetitanium (III) allyl,
(tert-butylamido)(tetramethyl-$\eta^5$-cyclopentadienyl)dimethylsilanetitanium (III) 2,4-dimethylpentadienyl,
(tert-butylamido)(tetramethyl-$\eta^5$-cyclopentadienyl)dimethylsilanetitanium (II) 1,4-diphenyl-1,3-butadiene,
(tert-butylamido)(tetramethyl-$\eta^5$-cyclopentadienyl)dimethylsilanetitanium (II) 1,3-pentadiene,
(tert-butylamido)(2-methylindenyl)dimethylsilanetitanium (II) 1,4-diphenyl-1,3-butadiene,
(tert-butylamido)(2-methylindenyl)dimethylsilanetitanium (II) 2,4-hexadiene,
(tert-butylamido)(2-methylindenyl)dimethylsilanetitanium (V) 2,3-dimethyl-1,3-butadiene,
(tert-butylamido)(2-methylindenyl)dimethylsilanetitanium (II) 1,3-pentadiene,
(tert-butylamido)(2-methylindenyl)dimethylsilanetitanium (IV) 1,3-butadiene,
(tert-butylamido)(2,3-dimethylindenyl)dimethylsilanetitanium (IV) 2,3-dimethyl-1,3-butadiene,
(tert-butylamido)(2,3-dimethylindenyl)dimethylsilanetitanium (IV) isoprene
(tert-butylamido)(2,3-dimethylindenyl)dimethylsilanetitanium (IV) dimethyl
(tert-butylamido)(2,3-dimethylindenyl)dimethylsilanetitanium (IV) dibenzyl
(tert-butylamido)(2,3-dimethylindenyl)dimethylsilanetitanium (IV) 1,3-butadiene,
(tert-butylamido)(2,3-dimethylindenyl)dimethylsilanetitanium (II) 1,3-pentadiene,
(tert-butylamido)(2,3-dimethylindenyl)dimethylsilanetitanium (II) 1,4-diphenyl-1,3-butadiene,
(tert-butylamido)(2-methyl-(s)indacenyl)dimethylsilanetitanium (II) 1,3-pentadiene,
(tert-butylamido)(2-methyl-(s)-indacenyl)dimethylsilanetitanium (IV) dimethyl,
(tert-butylamido)(2-methyl-(s)indacenyl)dimethylsilanetitanium (IV) dibenzyl,
(tert-butylamido)(2-methylphenylindenyl)dimethylsilanetitanium (1) 1,4-diphenyl-1,3-butadiene, (tert-butylamido)(2-methyl-4-phenylindenyl)dimethylsilanetitanium (1H) 1,3-pentadiene,
(tert-butylamido)(2-methylphenylindenyl)dimethylsilanetitanium (II) 2,4-hexadiene,
(cyclohexylamido)(tetramethyl-$\eta^5$-cyclopentadienyl)dimethylsilanetitanim (IV) dimethyl,
(tert-butylamido)(tetramethyl-$\eta^5$-cyclopentadienyl)dimethylsilanetitanium (IV) 2,3-dimethyl-1,3-butadiene,
(tert-butylamido)(tetramethyl-$\eta^5$-cyclopentadienyl)bis(4-dodecylphenyl)silanetitanium (IV) dimethyl,
(tert-butylamido)(tetramethyl-$\eta_5$-cyclopentadienyl)bis(4-dodecylphenyl)silanetitanium (II) 1,4-diphenyl-1,3-butadiene,
(tert-butylamido)(tetramethyl-$\eta^5$-cyclopentadienyl)bis(4-dodecylphenyl)silanetitanium (II) 1,3-pentadiene,
(tert-butylamido)(3-(N-pyrrolyl)indenyl)dimethylsilanetitanium (IV) 2,3-dimethyl-1,3-butadiene,
(tert-butylamido)(3-(N-pyrrolyl)indenyl)dimethylsilanetitanium (IV) isoprene
(tert-butylamido)(3-(N-pyrrolyl)indenyl)dimethylsilanetitanium (IV) dimethyl
(tert-butylamido)(3-(N-pyrrolyl)indenyl)dimethylsilanetitanium (IV) dibenzyl
(tert-butylamido)(3-(N-pyrrolyl)indenyl)dimethylsilanetitanium (IV) 1,3-butadiene,
(tert-butylamido)(3-(N-pyrrolyl)indenyl)dimethylsilanetitanium (II) 1,3-pentadiene,
(tert-butylamido)(3-(N-pyrrolyl)indenyl)dimethylsilanetitanium (II) 1,4-diphenyl-1,3-butadiene,
(tert-butylamido)(3-N-pyrrolidinylinden-1-yl)dimethylsilanetitanium (IV) dimethyl,
[N-(2,6-di(1-methylethyl)phenyl)amido)(o-tolyl)($\alpha$-naphthalen-2-diyl(6-pyridin-2-diyl)methane)]hafnium dimethyl,
[N-(2,6-di(1-methylethyl)phenyl)amido)(o-tolyl)($\alpha$-naphthalen-2-diyl(6-pyridin-2-diyl)methane)]hafnium di(N,N-dimethylamido),
[N-(2,6-di(1-methylethyl)phenyl)amido)(o-tolyl)($\alpha$-naphthalen-2-diyl(6-pyridin-2-diyl)methane)]hafnium dichloride,
[N-(2,6-di(1-methylethyl)phenyl)amido)(phenanthren-5-yl) ($\alpha$-naphthalen-2-diyl(6-pyridin-2-diyl)methane)]hafnium dimethyl,
[N-2,6-di(1-methylethyl)phenyl)amido)((henanthren-5-yl) ($\alpha$-naphthalen-2-diyl(6-pyridin-2-diyl)methane)]hafnium di(N,N-dimethylamido), and
[N-2,6-di(1-methylethyl)phenyl)amido)(phenanthren-5-yl) ($\alpha$-naphthalen-2-diyl(6-pyridin-2-diyl)methane)]hafnium dichloride.

The foregoing metal complexes are conveniently prepared by standard metallation and ligand exchange procedures involving a source of the transition metal and the neutral ligand source. The last six listed complexes have been previously disclosed in WO 02/38628. Other techniques to prepare the foregoing complexes may be used as well.

Suitable activating cocatalysts useful in combination with component a) are those compounds capable of abstraction of a substituent therefrom to form an inert, noninterfering counter ion, or that form a zwitterionic or other catalytically active derivative of a). Suitable activating cocatalysts for use herein include perfluorinated tri(aryl)boron compounds, and most especially tris(pentafluorophenyl)borane; nonpolymeric, compatible, noncoordinating, ion forming compounds (including the use of such compounds under oxidizing conditions), especially ammonium-, phosphonium-, oxonium-, carbonium-, silylium- or sulfonium-salts of compatible; noncoordinating anions, and ferrocenium salts of compatible, noncoordinating anions. A combination of the foregoing activating cocatalysts may be employed as well.

More particularly, suitable ion forming compounds useful as cocatalysts in one embodiment of the present invention comprise a cation which is a Bronsted acid capable of donating a proton, and a compatible, noncoordinating anion, $A^-$. Preferred anions are those containing a single coordination complex comprising a charge-bearing metal or metalloid core which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula:

$$(L^*-H)^+_d (A)^{d-n} \qquad (IX)$$

wherein:
L* is a neutral Lewis base;
$(L^*-H)^+$ is a Bronsted acid;
$A^{d-}$ is a noncoordinating, compatible anion having a charge of d–, and
d is an integer from 1 to 3.

More preferably $A^{d-}$ corresponds to the formula: $[M'Q_4]^-$;
wherein:
M' is boron or aluminum in the +3 formal oxidation state; and
Q independently each occurrence is selected from hydride, dialkylamido, halide, hydrocarbyl, hydrocarbyloxide, halosubstituted-hydrocarbyl, hydroxy-substituted hydrocarbyl, halosubstituted hydrocarbyloxy, and halo-substituted silylhydrocarbyl radicals (including perhalogenated hydrocarbyl-perhalogenated hydrocarbyloxy- and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433.

In a more preferred embodiment, d is one, that is, the counter ion has a single negative charge and is $A^-$. Activating cocatalysts comprising boron which are particularly useful in the preparation of catalysts of this invention may be represented by the following general formula:

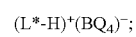

$$(L^*-H)^+(BQ_4)^-;$$

wherein:
L* is as previously defined;
B is boron in a formal oxidation state of 3; and
Q is a hydrocarbyl-, hydrocarbyloxy-, fluorinated hydrocarbyl-, fluorinated hydrocarbyloxy-, or fluorinated silylhydrocarbyl-group of up to 20 nonhydrogen atoms, with the proviso that in not more than one occasion is Q hydrocarbyl.

Most preferably, Q is each occurrence a fluorinated aryl group, especially, a pentafluorophenyl group.

Illustrative, but not limiting, examples of boron compounds which may be used as an activating cocatalyst in the preparation of the improved catalysts of this invention are tri-substituted ammonium salts such as:
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethyl-N-dodecylammonium tetrakis(pentafluorophenyl)borate,
N,N-dimethyl-N-octadecylammonium tetrakis(pentafluorophenyl)borate,
N-methyl-N,N-didodecylammonium tetrakis(pentafluorophenyl)borate,
N-methyl-N,N-dioctadecylammonium tetrakis(pentafluorophenyl)borate,
N,N-dimethylanilinium tetrakis(pentafluorophenyl)borate,
N,N-dimethylanilinium-butyltris(pentafluorophenyl)borate,
N,N-dimethylanilinium benzyltris(pentafluorophenyl)borate,
N,N-dimethylanilinium tetrakis(4-t-butyldimethylsilyl)-2,3,5,6-tetrafluorophenyl)borate,
N,N-dimethylanilinium tetrakis(4-triisopropylsilyl)-2,3,5,6-tetrafluorophenyl)borate,
N,N-dimethylanilinium pentafluorophenoxytris(pentafluorophenyl)borate,
N,N-dimethylanilinium tetrakis(pentafluorophenyl)borate,
N,N-dimethyl-2,4,6-trimethylanilinium tetrakis(pentafluorophenyl)borate,
trimethylammonium tetrakis(2,3,4,6-tetrafluorophenyl)borate,
triethylammonium tetrakis(2,3,4,6-tetrafluorophenyl)borate,
tripropylammonium tetrakis(2,3,4,6-tetrafluorophenyl)borate,
tri(n-butyl)ammonium tetrakis(2,3,4,6-tetrafluorophenyl)borate,
dimethyl(t-butyl)ammonium tetrakis(2,3,4,6-tetrafluorophenyl)borate,
N,N-dimethylanilinium tetrakis(2,3,4,6-tetrafluorophenyl)borate,
N,N-dimethylanilinium tetrakis(2,3,4,6-tetrafluorophenyl)borate, and
N,N-dimethyl-2,4,6-trimethylanilinium tetrakis(2,3,4,6-tetrafluorophenyl)borate;
disubstituted ammonium salts such as:
di-(i-propyl)ammonium tetrakis(pentafluorophenyl)borate, and
dicyclohexylammonium tetrakis(pentafluorophenyl)borate;
trisubstituted phosphonium salts such as:
triphenylphosphonium tetrakis(pentafluorophenyl)borate,
tri(o-tolyl)phosphonium tetrakis(pentafluorophenyl)borate, and
tri(2,6-dimethylphenyl)phosphonium tetrakis(pentafluorophenyl)borate;
disubstituted oxonium salts such as:
diphenyloxonium tetrakis(pentafluorophenyl)borate,
di(o-tolyl)oxonium tetrakis(pentafluorophenyl)borate, and
di(2,6-diethylphenyl)oxonium tetrakis(pentafluorophenyl)borate;
disubstituted sulfonium salts such as:
diphenylsulfonium tetrakis(pentafluorophenyl)borate,
di(o-tolyl)sulfonium tetrakis(pentafluorophenyl)borate, and
bis(2,6-dimethylphenyl)sulfonium tetrakis(pentafluorophenyl)borate.

Preferred $(L^*-H)^+$ cations are N,N-dimethylanilinium, tributylammonium, N-methyl-N,N-di(dodecyl)ammonium, N-methyl-N,N-di(tetradecyl)ammonium, N-methyl-N,N-di(hexadecyl)ammonium, N-methyl-N,N-di(octadecyl)ammonium, and mixtures thereof. The latter three cations are the primary ammonium cations derived from a commercially available mixture of $C_{14-18}$ tallow amines, and are collectively referred to as bis-hydrogenated tallowalkyl methylammonium cation. The resulting ammonium salt of the tetrakis(pentafluorophenyl)borate anion accordingly is know as bis-hydrogenated tallowalkyl methylammonium tetrakis(pentafluorophenyl)borate.

Another suitable ion forming, activating cocatalyst comprises a salt of a cationic oxidizing agent and a noncoordinating, compatible anion represented by the formula:

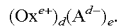

$$(Ox^{e+})_d(A^{d-})_e.$$

wherein:
$Ox^{e+}$ is a cationic oxidizing agent having a charge of e+;
e is an integer from 1 to 3; and
$A^{d-}$ and d are as previously defined.

Examples of cationic oxidizing agents include: ferrocenium, hydrocarbyl-substituted ferrocenium, $Ag^+$ or $Pb^{+2}$. Preferred embodiments of $A^{d-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion and a noncoordinating, compatible anion represented by the formula:

$$R'^+A^-$$

wherein:
$R'^+$ is a $C_{1-20}$ carbenium ion; and
$A^-$ is as previously defined. A preferred carbenium ion is the trityl cation, that is triphenylmethylium.

A further suitable ion forming, activating cocatalyst comprises a compound which is a salt of a silylium ion and a noncoordinating, compatible anion represented by the formula:

$$(R'')_3Si^+A^-$$

wherein:
R" is $C_{1-10}$ hydrocarbyl, and $A^-$ is as previously defined.

Preferred silylium salt activating cocatalysts are trimethylsilylium tetrakispentafluorophenylborate, triethylsilylium tetrakispentafluorophenylborate and ether substituted adducts thereof.

Certain complexes of alcohols, mercaptans, silanols, and oximes with tris(pentafluorophenyl)borane are also effective catalyst activators and may be used according to the present invention. Such cocatalysts are disclosed in U.S. Pat. No. 5,296,433, the teachings of which are herein incorporated by reference.

The most preferred activating cocatalysts are trispentafluorophenylborane and a mixture of long chain ammonium salts of tetrakis(pentafluorophenyl)borate, especially N,N-dioctadecyl-N-methylammonium tetrakpentafluorophenylborate, N-methyl-N,N-di(hexadecyl)ammonium tetrakpentafluorophenylborate and N,N-tetradecyl-N-methylammonium tetrakpentafluorophenylborate. The latter mixture of borate salts is derived from hydrogenated tallow amine, and is referred to as bis-hydrogenated tallowalkyl methylammonium tetrakis(pentafluorophenyl)borate.

The Group 13 component, component c) of the catalyst composition of the invention, preferably corresponds to the formula $R^1Al(NR^2{}_2)_2$ wherein $R^1$ is $C_{1-4}$ alkyl, and $R^2$ independently each occurrence is $C_{6-20}$ aryl, preferably phenyl or to the formula:

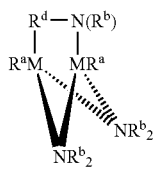

(2a)

wherein $R^a$ is $C_{1-4}$ alkyl, $R^b$ is $C_{6-20}$ aryl, preferably phenyl, and $R^d$ is $C_{6-20}$ arylene, preferably phenylene. A most highly preferred Group 13 component is bis(ethylaluminum-1-phenylene-2-(phenyl)amido μ-bisdiphenylamide.

The process may be used to polymerize ethylenically unsaturated monomers having from 2 to 20 carbon atoms either alone or in combination. Preferred monomers include monovinylidene aromatic monomers, 4-vinylcyclohexene, vinylcyclohexane, norbornadiene and $C_{2-10}$ aliphatic α-olefins (especially ethylene, propylene, isobutylene, 1-butene, 1-hexene, 3-methyl-1-pentene, 4-methyl-1-pentene, and 1-octene), $C_{4-40}$ dienes, and mixtures thereof. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENM) and 1,4-hexadiene (HD). Most preferred monomers are ethylene, mixtures of ethylene, propylene and ethylidenenorbornene, or mixtures of ethylene and a $C_{4-8}$ α-olefin, especially 1-octene.

In general, the polymerization may be accomplished at conditions well known in the prior art for Ziegler-Natta or Kaminsky-Sinn type polymerization reactions, that is, temperatures from 0–250° C., preferably 30 to 200° C. and pressures from atmospheric to 30,000 atmospheres or higher. Suspension, solution, slurry, gas phase, solid state powder polymerization or other process condition may be employed if desired. A support, especially silica, alumina, or a polymer (especially poly(tetrafluoroethylene) or a polyolefin) may be employed, and desirably is employed when the catalysts are used in a gas phase polymerization process. The support is preferably employed in an amount to provide a weight ratio of catalyst (based on metal):support from 1:100,000 to 1:10, more preferably from 1:50,000 to 1:20, and most preferably from 1:10,000 to 1:30.

In most polymerization reactions the molar ratio of catalyst:polymerizble compounds employed is from $10^{-12}$:1 to $10^{-1}$:1, more preferably from $10^{-9}$:1 to $10^{-5}$:1.

Suitable solvents for polymerization are inert liquids. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes, and aromatic and alkyl-substituted aromatic compounds such as benzene, toluene, xylene, and ethylbenzene. Suitable solvents also include liquid olefins which may act as monomers or comonomers including ethylene, propylene, butadiene, cyclopentene, 1-hexene, 1-hexene, 4-vinylcyclohexene, vinylcyclohexane, 3-methyl-1-pentene, 4-methyl-1-pentene, 1,4-hexadiene, 1-octene, 1-decene, styrene, divinylbenzene, allylbenzene, and vinyltoluene (including all isomers alone or in admixture). Mixtures of the foregoing are also suitable.

The catalysts may be utilized in combination with at least one additional homogeneous or heterogeneous polymerization catalyst in separate reactors connected in series or in parallel to prepare polymer blends having desirable properties.

Utilizing the catalyst compositions of the present invention copolymers having high comonomer incorporation and correspondingly low density, yet having a low melt index may be readily prepared. That is, high molecular weight polymers are readily attained by use of the present catalysts even at elevated reactor temperatures. This result is highly desirable because the molecular weight of α-olefin copolymers can be readily reduced by the use of hydrogen or similar chain transfer agent, however increasing the molecular weight of α-olefin copolymers is usually only attainable by reducing the polymerization temperature of the reactor. Disadvantageously, operation of a polymerization reactor at reduced temperatures significantly increases the cost of operation since heat must be removed from the reactor to maintain the reduced reaction temperature, while at the same time heat must be added to the reactor effluent to vaporize the solvent. In addition, productivity is increased due to improved polymer solubility, decreased solution viscosity, and a higher polymer concentration. Utilizing the present catalyst compositions, α-olefin homopolymers and copolymers having densities from 0.85 g/cm$^3$ to 0.96 g/cm$^3$, and melt flow rates from 0.001 to 10.0 dg/min are readily attained in a high temperature process.

The catalyst compositions of the present invention are particularly advantageous for the production of ethylene homopolymers and ethylene/α-olefin copolymers having high levels of long chain branching. The use of the catalyst compositions of the present invention in continuous polymerization processes, especially continuous solution polymerization processes, allows for elevated reactor temperatures which favor the formation of vinyl terminated polymer chains that may be incorporated into a growing polymer, thereby giving a long chain branch. The use of the present catalyst compositions advantageously allows for the economical production of ethylene/α-olefin copolymers having processability similar to high pressure, free radical produced low density polyethylene.

As previously mentioned, the present catalyst composition is particularly useful in the preparation of EP and EPDM copolymers in high yield and productivity. The process employed may be either a solution or slurry process both of which are previously known in the art. Kaminsky, *J. Poly. Sci.*, Vol. 23, pp. 2151–64 (1985) reported the use of a soluble bis(cyclopentadienyl)zirconium dimethyl-alumoxane catalyst system for solution polymerization of EP and EPDM elastomers. U.S. Pat. No. 5,229,478 disclosed a slurry polymerization process utilizing similar bis(cyclopentadienyl)zirconium based catalyst systems.

The catalyst composition may be prepared as a homogeneous catalyst by addition of the requisite components to a solvent in which polymerization will be carried out by solution polymerization procedures. The catalyst composition may also be prepared and employed as a heterogeneous catalyst by adsorbing the requisite components on a catalyst support material such as silica gel, alumina or other suitable inorganic support material. When prepared in heterogeneous or supported form, it is preferred to use silica as the support material. The heterogeneous form of the catalyst system is employed in a slurry polymerization. As a practical limitation, slurry polymerization takes place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. Likewise the α-olefin monomer or a mixture of different α-olefin monomers may be used in whole or part as the diluent. Most preferably the diluent comprises in at least major part the α-olefin monomer or monomers to be polymerized.

In contrast, solution polymerization conditions utilize a solvent for the respective components of the reaction, particularly the EP or EPDM polymer. Preferred solvents include mineral oils and the various hydrocarbons which are liquid at reaction temperatures. Illustrative examples of useful solvents include alkanes such as pentane, iso-pentane, hexane, heptane, octane and nonane, as well as mixtures of alkanes including kerosene and Isopar E™, available from Exxon Chemicals Inc., cycloalkanes such as cyclopentane and cyclohexane; and aromatics such as benzene, toluene, xylenes, ethylbenzene and diethylbenzene.

At all times, the individual ingredients as well as the recovered catalyst components must be protected from oxygen and moisture. Therefore, the catalyst components and catalysts must be prepared and recovered in an oxygen and moisture free atmosphere. Preferably, therefore, the reactions are performed in the presence of a dry, inert gas such as, for example, nitrogen.

Generally the polymerization process is carried out with a differential pressure of ethylene of from 10 to 1000 psi (70 to 7000 kPa), most preferably from 40 to 400 psi (30 to 300 kPa). The polymerization is generally conducted at a temperature of from 25 to 200° C., preferably from 75 to 170° C., and most preferably from greater than 95 to 160° C.

The polymerization may be carried out as a batchwise or a continuous polymerization process. A continuous process is preferred, in which event the catalyst composition or the individual components thereof, monomer(s), and optionally solvent are continuously supplied to the reaction zone and polymer product continuously or semicontinuously removed therefrom.

The skilled artisan will appreciate that the invention disclosed herein may be practiced in the absence of any component which has not been specifically disclosed. The following examples are provided as further illustration of the invention and are not to be construed as limiting. Unless stated to the contrary all parts and percentages are expressed on a weight basis.

EXAMPLE 1

Bis(ethylaluminum)-1-phenylene-2-(phenyl)amido μ-bisdiphenylamide

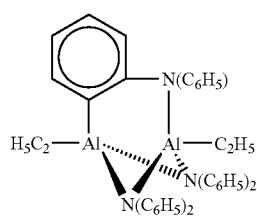

A 30 L glass reactor was charged with 12 L of toluene followed by 2.744 kg of a 25 percent solution of triethylaluminum in toluene. The solution was heated to 90° C. In a dry box 2.034 kg of diphenylamine was dissolved in 8 L of toluene. This solution was slowly added to the triethylaluminum solution over a period of three hours through a transfer line. After completion of the diphenylamine addition, the solution temperature was maintained between 95–105° C. for 72 hours. The resulting reaction mixture was cooled and transferred to a dry nitrogen purged receiver.

A portion of the resulting product was removed from the receiver, concentrated and a single crystal prepared for analysis by X-ray crystallography. The resulting structure (ORTEP) is shown in FIG. 1.

Ethylene/1-Octene Copolymerization

A stirred 3.8 liter reactor was charged with 1450 g of Isopar-E™ mixed alkanes solvent (available from Exxon Chemicals Inc.) and 126 g of 1-octene comonomer. Hydrogen (10 mMol) was added as a molecular weight control agent using a mass flow meter. The reactor was heated to the polymerization temperature of 130° C. and saturated with ethylene at 450 psig (3.1 MPa). Catalyst, (t-butylamido) dimethyl($\eta^5$-tetramethylcyclopentadienyl)silanetitanium (II) $\eta^4$-1,3-pentadiene (A), and cocatalyst, trispentafluorophenylborane (FAB), were dissolved in Isopar E™ and premixed in a drybox with the aluminum tertiary component, and transferred to a catalyst addition system and injected into the reactor over approximately 3 minutes using a flow of high pressure Isopar E™ solvent. The polymerization conditions were maintained for 10 minutes with ethylene supplied on demand to maintain 450 psig reactor pressure. The ethylene consumed during the reaction was monitored using a mass flow meter and this consumption was used to calculate the catalyst efficiency.

High crystalline fraction (HCF) analysis was measured semi-quantitatively using the cooling curve of a differential scanning calorimetry scan for each polymer. The scan was examined to determine if the HCF peak appearing in the region from 75–78° C. was detectable and, if so, whether the peak was slight (detectable but not readily measurable) or significant (measurable). Then each 3rd component was given a HCF score based on the following criteria:

1. No detectable HCF
2. Slight to not detectable HCF
3. Significant to slight HCF
4. Significant HCF.

Results are contained in Table 1.

TABLE 1

| Run | Catalyst (μmol) | Cocatalyst (μmol) | Aluminum compound (μmol) | $C_2H_5$ consumed (g) | Efficiency[1] | HCF[2] |
|---|---|---|---|---|---|---|
| 1 | 2.50 | 7.50 | 25.0 | 71.3 | 28.52 | 1 |
| 2* | 2.50 | 7.50 | 0 | 15.9 | 6.36 | 4 |
| 3* | 4.50 | 13.50 | 0 | 44.8 | 9.96 | 4 |

*comparative, not an example of the invention
[1] grams of ethylene consumed per μmol of titanium.
[2] high crystallinity fraction, semi-quantitative value Ethylene/Styrene Copolymerization A stirred 3.8 liter reactor was charged with toluene and styrene comonomer. The reactor was sealed and heated to the polymerization temperature and saturated with ethylene at 275 psig (2.0 MPa). Catalyst, (t-butylamido)dimethyl($\eta^5$-tetramethylcyclopentadienyl)silanetitanium (II) $\eta^4$-1,3-pentadiene (A), dimethyl[N-(1,1-dimethylethyl)-1,1-dimethyl-[1,2,3,4,5-$\eta$)-1,5,6,7-tetrahydro-2-methyl-s-indacen-1-yl]silanaminto(2-)-N]titanium (B), prepared according to the teachings of U.S. Pat. No. 5,965,756, or (1H-cyclopenta[l]phenanthrene-2-yl)dimethyl(t-butylamido)silanetitanium dimethyl, prepared according to the teachings of U.S. Pat. No. 6,150,297 (C), and cocatalyst, bis-hydrogenated tallowalkyl methylammonium tetrakis(pentafluorophenyl)borate (D) prepared according to the teachings of U.S. Pat. No. 5,919,983, or (trispentafluorophenylborane (E) or were dissolved in toluene and premixed in a drybox with the aluminum tertiary component, (bis(ethylaluminum)-1-phenylene-2-(phenyl)amido µ-bisdiphenylamide (F) or methylalumoxane (G)) and transferred to a catalyst addition system and injected into the reactor over approximately 1–2 minutes using a flow of high pressure solvent. The polymerization conditions were maintained for 10 minutes with ethylene supplied on demand to maintain reactor pressure. The polymer solution was discharged from the reactor into a nitrogen-purged glass kettle containing 200 mL of isopropanol and additive (IRGANOX 1010 and IRGAFOS 168). The polymer solution was poured into a tray, air dried overnight, then thoroughly dried in a vacuum oven for several days. The ethylene consumed during the reaction was monitored using a mass flow meter and used to calculate the catalyst efficiency. Results are contained in Table 2.

TABLE 2

| Run | Cat. (µmol) | Cocat. (µmol) | Al comp. (µmol) | Temp. °C. | $C_2H_5$ (MPa) | Toluene (g) | Styrene (g) | Eff.[1] | HCF |
|---|---|---|---|---|---|---|---|---|---|
| 4 | C(5) | D(5.5) | F(125) | 110 | 2.2 | 1200 | 400 | 2.80 | 1 |
| 5* | C(5) | D(5.5) | — | 110 | " | " | " | 0.20 | 4 |
| 6 | C(5) | E(7.5) | F(125) | 110 | " | " | " | 20.64 | 1 |
| 7* | C(5) | E(7.5) | — | 110 | " | " | " | 5.14 | 4 |
| 8 | B(18) | E(27) | F(180) | 110 | " | 900 | 700 | 2.96 | 1 |
| 9 | B(18) | E(27) | G(180) | 110 | " | " | " | 0.08 | 3 |
| 10 | A(10) | E(15) | F(100) | 80 | 1.5 | 700 | 900 | 6.23 | 1 |
| 11 | A(10) | E(15) | G(100) | 80 | 1.5 | " | " | 0.13 | 3 |

*comparative, not an example of the invention
[1]grams of ethylene consumed per µmol of titanium.
A: [($\eta^5$-Me$_4$C$_5$)SiMe$_2$N$^t$Bu]Ti($\eta^4$-1,3-pentadiene) (CAS number 169104-71-6)
B: [($\eta^5$-MeC$_{12}$H$_9$)SiMe$_2$N$^t$Bu]Ti($\eta^4$-1,3-pentadiene) (CAS numbers 199876-48-7 and 200074-30-2; mixture of isomers)
C: [($\eta^5$-C$_{17}$H$_{10}$)SiMe$_2$N$^t$Bu]TiMe$_2$ (CAS number 221527-98-6)
D: R$_2$N(H)Me B(C$_6$F$_5$)$_4$, R = hydrogenated tallowalkyl (C$_{14-18}$ alkyl)(CAS number 200644-82-2)
E: (C$_6$F$_5$)$_3$B (CAS number 1109-15-5)
F: Reaction product of Et$_3$Al with 2 molar equivalents of Ph$_2$NH according to Example 1
G: methylalumoxane (MMAO Type 3A, Akzo Nobel Company)

The invention claimed is:

1. A catalyst composition for polymerization of addition polymerizable monomers comprising:
   a) a transition metal complex corresponding to the formula: $L_lMX_pX'_q$,
   wherein: M is a metal of Group 4 of the Periodic Table of the Elements havin an oxidation state of +2, +3 or +4, bound in an $\eta^5$ bonding mode to one or more L groups;

L independently each occurrence is a cyclopentadienyl-, indenyl-, tetrahydroindenyl-, fluorenyl-, tetrahydrofluorenyl-, or octahydrofluorenyl- group optionally substituted with from 1 to 8 substituents independently selected from the group consisting of hydrocarbyl, halo, halohydrocarbyl, aminohydrocarbyl, hydrocarbyloxy, dihydrocarbylamino, dihydrocarbylphosphino, silyl, aminosilyl, hydrocarbyloxysilyl, and halosilyl groups containing up to 20 non-hydrogen atoms, or further optionally two such L groups may be joined together by a divalent substituent selected from hydrocarbadiyl, halohydrocarbadiyl, hydrocarbyleneoxy, hydrocarbyleneamino, siladiyl, halosiladiyl, and divalent aminosilane groups containing up to 20 non-hydrogen atoms;

X independently each occurrence is a monovalent or polyvalent anionic ligand group having one or more shared or donative bonds to M, and optionally one or more shared or donative bonds to one or more L groups, said X containing up to 60 nonhydrogen atoms;

X' independently each occurrence is a neutral Lewis base ligating compound, having up to 20 atoms;

t, p, and q are 0, 1 or 2;

b) an activator compound; and c) a Group 13 metal compound corresponding to the formula:

$$R^aM(N(R^b)_2)_2 \quad \text{or} \quad (1)$$

$$\begin{array}{cc} R^d - N(R^b); \\ | \quad | \\ R^c_2M \quad MR^c_2 \end{array} \quad (2)$$

wherein,

M, independently each occurrence is a group 13 metal;

$R^a$ is a hydrocarbyl, halocarbyl, halohydrocarbyl, tri(hydrocarbyl)silyl, or tri(hydrocarbyl)silyl- substituted hydrocarbyl radical of from 1 to 20 carbon, silicon or mixtures of carbon and silicon atoms;

$R^b$ independently each occurrence is a $C_{1-30}$ hydrocarbyl group;

$R^c$ independently each occurrence is selected from the group consisting of hydrogen, $R^a$, $—NR^b_2$, and halo- or di($C_{1-10}$ hydrocarbyl)amino- substituted hydrocarbyl groups, and optionally one or more $R^c$ groups may be shared by both metal centers, M, in the form of a μ-bridged structure; and $R^d$, is a divalent, anionic ligand group of up to 30 atoms, not counting hydrogen.

2. A catalyst composition according to claim 1 wherein the Group 13 component corresponds to the formula $R_1Al(NR^2{}_2)_2$ wherein $R^1$ is $C_{1-4}$ alkyl, and $R^2$ independently each occurrence is $C_{6-20}$ aryl, or to the formula:

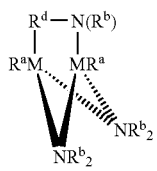

(2a)

wherein $R^2$ is $C_{1-4}$ alkyl, $R^b$ is $C_{6-20}$ aryl, and $R^d$ is $C_{6-20}$ arylene.

3. A catalyst composition according to claim 2 wherein the Group 13 component is bis(ethylaluminum)-1-phenylene-2-(phenyl)amido μ-bisdiphenylamide.

4. A catalyst composition according to claim 1 wherein the molar ratio of metal complex to component b) is from 1:1 to 1:50.

5. A catalyst composition according to claim 1 wherein the activating cocatalyst comprises trispentafluorophenylborane, N-methyl-N,N-dioctadecylanimonium tetrakis(pentafluorophenyl)borate, or bis-$C_{14-18}$ alkyl methylammonium tetrakis(pentafluorophenyl)borate.

6. A process for polymerization of addition polymerizable monomers or mixtures thereof comprising contacting said monomer or mixture of monomers with a catalyst system comprising the catalyst composition of claim 1 under addition polymerization conditions.

7. The process of claim 6 wherein the addition polymerizable monomer is a $C_{2-20}$ α-olefin or a mixture thereof.

8. The process of claim 7 wherein ethylene and styrene are copolymerized.

* * * * *